United States Patent
Alexandersson et al.

(10) Patent No.: US 9,342,170 B2
(45) Date of Patent: May 17, 2016

(54) DEVICE AND METHOD FOR DELAYING ADJUSTMENT OF DISPLAY CONTENT OUTPUT ON A DISPLAY BASED ON INPUT GESTURES

(75) Inventors: Petter Alexandersson, Bjärred (SE); David De Léon, Lund (SE); Fredrik Johansson, Malmö (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 411 days.

(21) Appl. No.: 13/814,653

(22) PCT Filed: Feb. 17, 2012

(86) PCT No.: PCT/EP2012/052810
§ 371 (c)(1),
(2), (4) Date: Feb. 6, 2013

(87) PCT Pub. No.: WO2013/120537
PCT Pub. Date: Aug. 22, 2013

(65) Prior Publication Data
US 2014/0085227 A1    Mar. 27, 2014

(51) Int. Cl.
*G06F 3/041* (2006.01)
*G06F 3/0488* (2013.01)
*G06F 1/16* (2006.01)

(52) U.S. Cl.
CPC .............. *G06F 3/041* (2013.01); *G06F 1/1694* (2013.01); *G06F 3/04883* (2013.01); *G06F 2200/1614* (2013.01); *G06F 2200/1637* (2013.01)

(58) Field of Classification Search
CPC ............................................. G06F 2203/04806
See application file for complete search history.

(56) References Cited

U.S. PATENT DOCUMENTS

| | | | |
|---|---|---|---|
| 2005/0275638 A1* | 12/2005 | Kolmykov-Zotov | G06F 3/04883 345/179 |
| 2008/0165152 A1 | 7/2008 | Forstall et al. | |
| 2010/0149090 A1* | 6/2010 | Morris | H04L 67/42 345/156 |
| 2010/0188328 A1* | 7/2010 | Dodge | G06F 3/0346 345/156 |

(Continued)

FOREIGN PATENT DOCUMENTS

| | | |
|---|---|---|
| WO | 2007103631 A2 | 9/2007 |
| WO | 2011008603 A1 | 1/2011 |

OTHER PUBLICATIONS

International Search Report and Written Opinion dated Aug. 28, 2012 issued in corresponding PCT application No. PCT/EP2012/052810, 10 pages.

*Primary Examiner* — Ryan A Lubit
(74) *Attorney, Agent, or Firm* — Tucker Ellis LLP; Morris Galin

(57) ABSTRACT

The present invention relates to display in an electrical device and a method of enhancing interaction with user. The display comprises: a controller, a content displaying surface, a touch sensitive portion comprising one or several touch sensors, for providing the controller with information about presence of a pointing object close to the surface, a motion sensor for providing motion of the display. The controller is configured to control content output on the displaying surface and adjust the content output with respect to information from the touch sensor and the motion sensor.

16 Claims, 3 Drawing Sheets

(56) References Cited

U.S. PATENT DOCUMENTS

| | | | |
|---|---|---|---|
| 2010/0251152 A1* | 9/2010 | Cho | G06F 1/1626 715/765 |
| 2012/0154294 A1* | 6/2012 | Hinckley | G06F 1/1649 345/173 |
| 2012/0169624 A1* | 7/2012 | Garn | G06F 3/04886 345/173 |

* cited by examiner

DEVICE AND METHOD FOR DELAYING ADJUSTMENT OF DISPLAY CONTENT OUTPUT ON A DISPLAY BASED ON INPUT GESTURES

TECHNICAL FIELD

The present invention relates to displays in general, and displays comprising touch sensors and display orientation sensors, which may change the displayed content orientation.

BACKGROUND

It is known that due to the small size of the electrical devices provided with displays, especially touch sensitive displays, for interaction with the user, the devices are normally equipped with functionality of rotating the display to provide the user with larger reproduction of content and user input area. To achieve this, the device may be provided with tilting or movement sensors, sensing the orientation of the device and its display and generating a signal to change the content orientation when a change of orientation is sensed. In the following, this functionality is referred to as rotation or autorotation.

One problem with autorotation is accidental autorotation, which for a user may cause frustration. The situation where the user accidentally tilts the device and the UI (User Interface: content on the display) rotates unintentionally may result in poor user experience and may interrupt the UI operation.

The problem may be prominent when a user intends to press a UI object, such as virtual key or an icon, aiming a pointing object (e.g. finger) towards the visible object on the display and starts moving the pointing object towards the target. Then, due to a slight tilting of the display, e.g. due to movement of the hand or finger, the display content is relocated (autorotated) and the object is missed or another object is pressed.

SUMMARY

Thus, one object of the present invention is to remedy above mentioned problem.

Thus, according to the invention relates to a display communicating with a motion sensor for providing motion information of the display. The display comprises: a content displaying surface, a touch sensitive portion comprising one or several touch sensors configured to generate a signal about presence of a pointing object close to the surface, and a controller configured to control content output on the displaying surface and adjust the content output with respect to information from the touch sensor and the motion sensor.

According to one embodiment of the invention, the adjustment may comprise storing coordinates of a content object and displaying the content with same coordinates after rotation of display. According to a second embodiment of the invention, the adjustment comprises preventing the display content from rotating. According to a third embodiment of the invention, the adjustment comprises delaying display content rotation. According to a fourth embodiment of the invention, the adjustment comprises changing speed of display content rotation. In yet another embodiment the adjustment comprises forcing a content rotation and may be initiated with predetermined gesture. Two or more of the embodiments may be combined. In the display, the touch sensor is configured to detect one or several of: presence of the pointing object close to the display, presence of the pointing object over a specific area, a distance to the pointing object, angle of the pointing object, or speed of the pointing object approaching the display surface.

The invention also relates to an electric device comprising a display as previously described. The electrical device may be a mobile telecommunication terminal.

The invention also relates to a method of enhancing interaction with a touch sensitive display, the display comprising: a controller, a content displaying surface, a touch sensitive portion comprising one or several touch sensors, for providing the controller with information about presence of a pointing object close to the surface, a motion sensor for providing motion of the display. The method comprises: detecting a pointing object close to the surface by the one or several touch sensors, detecting motion of the display, controlling content output on the displaying surface by the controller, and adjusting the content output with respect to information from the touch sensor and the motion sensor. According to one embodiment of the invention, the adjustment may comprise storing coordinates of a content object and displaying the content with same coordinates after rotation of display. According to a second embodiment of the invention, the adjustment comprises preventing the display content from rotating. According to a third embodiment of the invention, the adjustment comprises delaying display content rotation. According to a third embodiment of the invention, the adjustment comprises changing speed of display content rotation. Two or more of the embodiments may be combined.

BRIEF DESCRIPTION OF THE DRAWINGS

Reference is made to the attached drawings, wherein elements having the same reference number designation may represent like elements throughout.

DETAILED DESCRIPTION

The following detailed description refers to the accompanying drawings. The same reference numbers in different drawings may identify the same or similar elements. The term "image," as used herein, may refer to a digital or an analog representation of visual information (e.g., a picture, a video, a photograph, animations, etc.)

Figure 3:
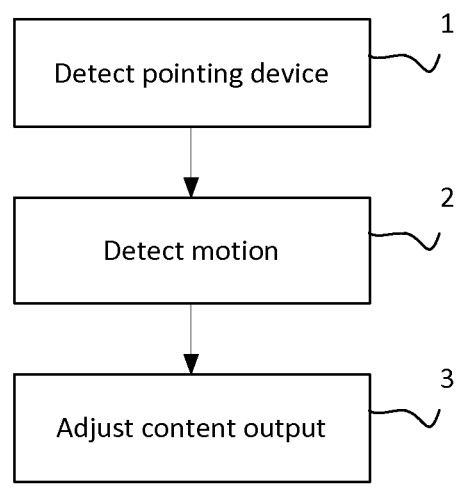
FIG. 3 is an illustrative example of a flow diagram illustrating method steps according to the present invention.

The present invention solves the above mentioned problem by detecting (1), FIG. 3, when the pointing object approaches the display surface and adjusts (3) content output by preventing touching and/or choosing a wrong content object due to unintentional UI rotation and/or forcing a rotation by analyzing (2) sensed data from the display touch sensor.

Figure 1:
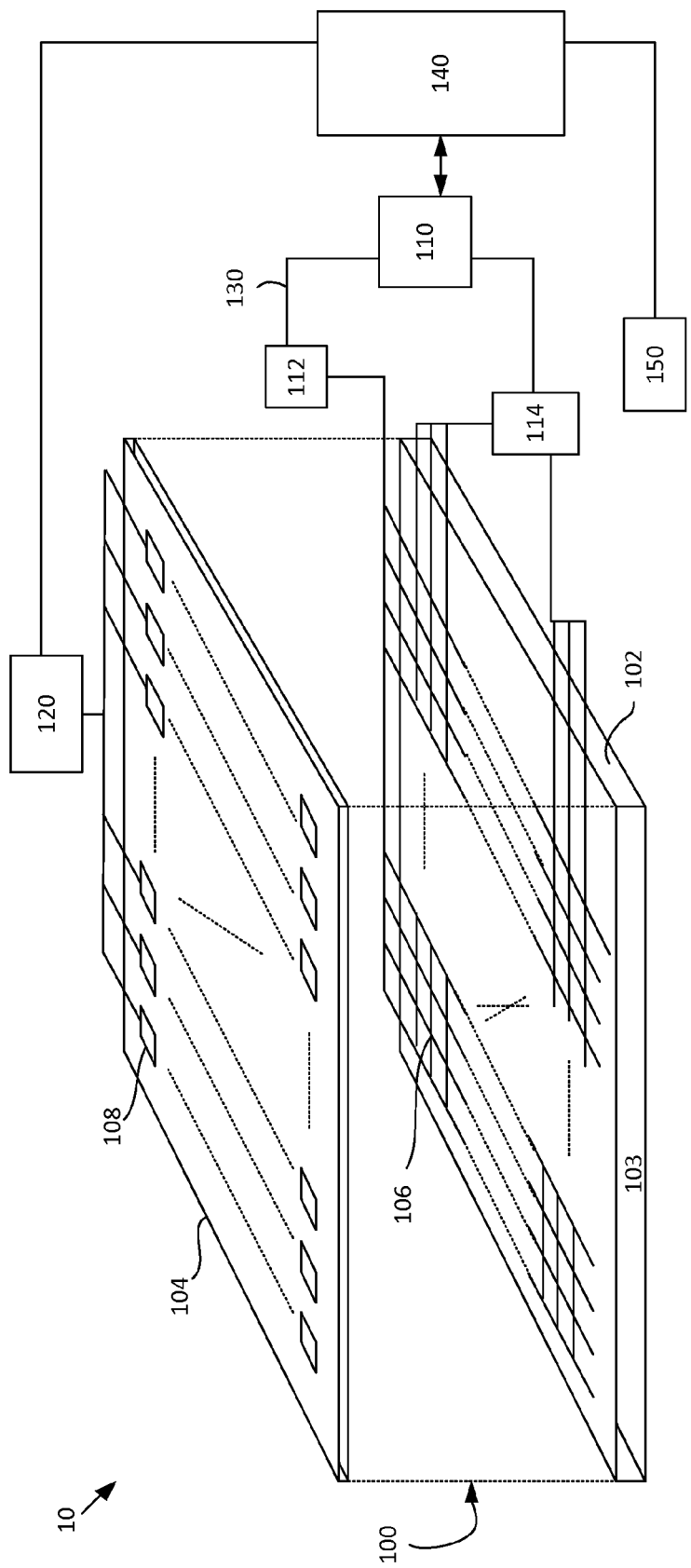
FIG. 1 is a diagram of an exemplary system in which methods and systems described herein may be implemented.

FIG. 1 illustrates one embodiment of the present invention, illustrating a schematic simplified touch sensitive display device 10. The touch sensitive display device 10 includes a panel module 100, a driving device 110 and a touch processor 120. The panel module 100 includes a display panel 102 and a touch panel 104. The display panel 102 is utilized for displaying images, and includes a substrate 103 and pixel units 106 arranged in a matrix. The touch panel 104 includes touch sensors 108 arranged in a matrix for sensing one or multiple touch points created by a finger or an object. To simultaneously drive the pixel units 106 and the touch sensors 108, the driving device 110 may include a source driver 112, and a gate driver 114. The source driver 112 is utilized for generating source driving signals according to an image signal 130 to indicate color intensities of the pixel units 106. The gate driver 114 is utilized for generating scanning impulses according to a synchronization signal to indicate an updating sequence of the pixel units 106. Finally, the touch processor 120 determines the touch point according to response impulses. It is only one exemplary embodiment of a display module and its functional units. Other embodiments, using other technics, such as LED, LCD, plasma etc. may also occur.

The touch sensors 108 and driver 110 may communicate with a controller 140, such as a micro-processor. A sensor 150, such as an accelerometer, detects motion of the device and screen and communicates with the controller. The controller provides through driver 110, the drivers 112 and 114 with information for outputting a pixel through pixel units 106. A finger or an object is sensed by the touch sensors 108 and information is provided to the controller 140.

According to one embodiment of the invention when the pointing object approaches the display surface (e.g. 1-15 mm), the touch sensors 108 detect and register the presence of the object. The detection and parameters, such as position (x, y) on the surface, distance (z) to the surface, angle and speed are communicated to the controller 140.

The controller 140 processes the data from the touch sensors 108 for:

Object presence close to the screen (hovering),
  Information from two or more touch sensors 108 providing varying x and y coordinates (with respect to the display surface) is interpreted as the object is above the display.
Object presence in an specific area,
  Information from a touch sensor 108 provides an x and y coordinate (with respect to the display surface) is interpreted as the object is in specific position on the display.
Object at a certain distance from the surface,
  Information from one or several touch sensors 108 provides one or several x- and y-coordinates (with respect to the display surface) and a z-coordinate (distance).
Object presence with a certain angle with respect to the surface,
  Information from one or several touch sensors 108 provides one or several x and y coordinates (with respect to the display surface) and one or two z coordinates. At least two z coordinates and x/y coordinates allow calculation of an angle (v) between the object and the display surface (e.g. $\tan v=(x_2-x_1)/(z_2-z_1)$).
Object approaching the surface with a certain speed.
  Information from several touch sensors 108 provides several x, y and z coordinates (with respect to the display surface). The change between the coordinate values determines the speed of the approaching object.

Figure 2A:
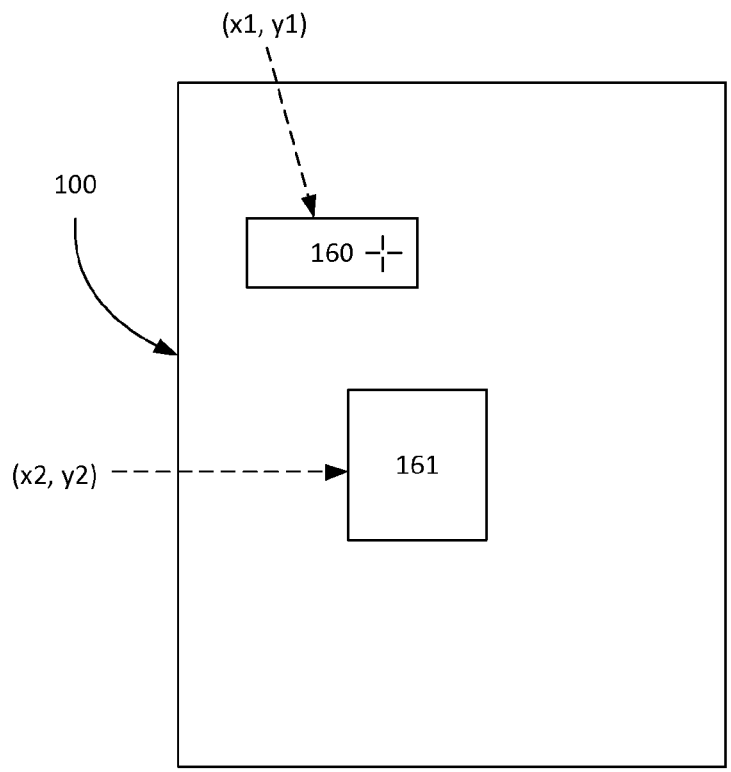
FIG. 2 illustrates a schematic view of a user interface according to one embodiment of the invention.
Figure 2B:
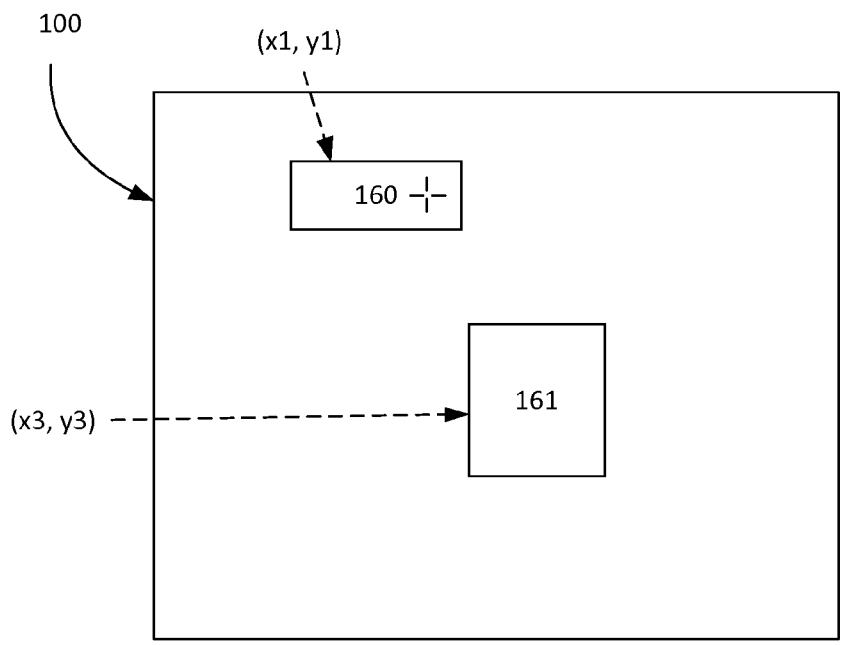

By detecting above parameters, one or several of the following actions can be carried out:

Preventing screen from rotating,
  When the controller receives information about the presence of the pointing object and simultaneously a change of orientation of the display is indicated by the accelerometer 150, the controller can stop autorotation of the display content.
Saving UI objects positions (coordinates) to make sure that the intended object is touched,
  When the controller receives information about the presence of the pointing object and simultaneously a change of orientation of the display is indicated by the accelerometer 150, the coordinates for one or several objects in the displayed content are saved in a memory and the display content is rotated. FIGS. 2a and 2b illustrate a display 100 with two objects 160 (coordinates x1,y1) and 161 (coordinates x2,y2). Assume that the user points (marked with crosshair) at object 160. When the controller receives information from the touch sensor the position (x1,y1) of the object 160 is saved. After rotation at least object 160 closest to the pointing object is displayed in same coordinates (position) while object 161 is relocated (coordinates x3,y3). The coordinates may be recalculated to fit the display.
Delay screen autorotation, combining accelerometer data with touch sensor data to control rotation (speed, delay, etc.)
  When the controller receives information about the presence of the pointing object and simultaneously a change of orientation of the display is indicated by the accelerometer 150, the controller instructs the display driver to change the speed of the rotation of the content (decrease) or delay the rotation, e.g. until an UI object is chosen.
Customize rotation behavior for application specific needs, e.g. for different touch patterns of pointing object.
  When the controller receives information about the presence of the pointing object and simultaneously a change of orientation of the display is indicated by the accelerometer 150, the controller instructs the display driver output content based on predetermined regulations.

Above examples describe preventing and/or delaying the rotation. However, the teachings of the invention may also be used to force a rotation. This may be controlled using a specific gesture or movement of the pointing object above the touch sensitive screen. One example may be when the device is resting on a table and user wants to rotate the content. In this case the lack of signal from the motion sensor together with a predetermined gesture may be used to execute the command of rotating the content.

The touch sensor may be, depending on the application, any of resistive, capacitive, surface capacitive, etc. In one embodiment, the touch sensor may comprise: an insulating support defining a front side, a membrane arranged on the front side of the support, which may include at least one layer including a pattern of electrically conductive material; at least one capacitance measuring unit configured for measuring a capacitance between at least a portion of the pattern of one of the layers and its surrounding environment; and at least one resistance measuring unit for measuring a resistance between a pair of points of the pattern of one of the at least one layer.

A "device" as the term is used herein, is to be broadly interpreted to include a radiotelephone, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can include a radiotelephone or wireless communication system; a laptop; a camera (e.g., video and/or still image camera) having communication ability; and any other computation or communication device having a touch sensitive display and a sensor for providing information on display orientation, such as a personal computer, a home entertainment system, a television, etc.

The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

What we claim is:

1. A display comprising:
   a content displaying surface comprising display content, the display content comprising a content object,
   a controller configured to control the display content on the content displaying surface and adjust the display content with respect to information received by the controller,
   a touch sensitive portion comprising one or more touch sensors configured to detect, and generate information regarding, a hover input when presence of a pointing object is within a threshold distance from the content displaying surface and communicate the information about the presence of the pointing object to the controller,
   a motion sensor configured to detect a motion of the display and communicate information about the motion of the display to the controller,
   wherein, when the information about the presence of the pointing object indicates the hover input and is received by the controller at the same time the information about the motion of the display is indicated at the controller, the controller delays the adjustment of the display content until the content object of the display content is selected by the pointing object, and performs the adjustment of the display content after the content object is selected; and
   wherein the adjustment comprises rotating the display content.

2. The display according to claim 1, wherein the information regarding the hover input of the pointing object includes an X coordinate and a Y coordinate of the pointing object with respect to the content displaying surface.

3. The display according to claim 2, wherein the controller only delays the adjustment if at least a portion of the content object is displayed on the content displaying surface at the X coordinate and the Y coordinate of the pointing object with respect to the content displaying surface.

4. The display according to claim 1, wherein the information regarding the hover input of the pointing object includes an angle of the pointing object with respect to the content displaying surface.

5. The display according to claim 1, wherein the information regarding the hover input of the pointing object includes a Z coordinate that represents a distance of the pointing object above the content displaying surface.

6. The display according to claim 1, wherein the information regarding the hover input of the pointing object includes a speed at which the pointing object is approaching the content displaying surface.

7. The display according to claim 6, wherein the information regarding the hover input of the pointing object further includes a plurality of sets of X, Y, and Z coordinates of the pointing object;
   wherein the X coordinate and the Y coordinate of each set represents a position of the pointing object with respect to the content displaying surface, and the Z coordinate of each set represents a distance of the pointing object above the content displaying surface; and
   wherein the change between the corresponding coordinate values in each set determines the speed at which the pointing object is approaching the content displaying surface.

8. A method of enhancing interaction with a touch sensitive display, the display including a controller, a content display surface with a touch sensitive portion, one or more touch sensors, and a motion sensor, the method comprising:
   displaying content on the display surface, the content comprising a content object,
   detecting a hover input when a pointing object is within a threshold distance from the display surface by the one or more touch sensors,
   sending information about the detected hover input of the pointing object to the controller,
   detecting a motion of the display by the motion sensor,
   sending information about the detected motion to the controller,
   receiving the information about the detected presence of the pointing device and the information about the detected motion at the controller,
   delaying, when the information about the detected hover input is received by the controller at the same time the information about the motion of the display is indicated at the controller, the adjustment of the content until the content object of the display content is selected by the pointing object, and performing the adjustment of the display content after the content object is selected, wherein the adjustment comprises rotating the display content.

9. The method according to claim 8, wherein the information about the detected hover input of the pointing object includes an X coordinate and a Y coordinate of the pointing object with respect to the content displaying surface.

10. The method according to claim 9, wherein the delaying the adjustment only occurs if at least a portion of the content object is displayed on the content displaying surface at the X coordinate and the Y coordinate of the pointing object with respect to the content displaying surface.

11. The method according to claim 8, wherein the information about the detected hover input of the pointing object includes an angle of the pointing object with respect to the content displaying surface.

12. The method according to claim 8, wherein the information about the detected hover input of the pointing object includes a Z coordinate that represents a distance of the pointing object above the content displaying surface.

13. The method according to claim 8, wherein the information about the detected hover input of the pointing object includes a speed at which the pointing object is approaching the content displaying surface.

14. The method according to claim 13, wherein the information about the detected hover input of the pointing object further includes a plurality of sets of X, Y, and Z coordinates of the pointing object;

wherein the X coordinate and the Y coordinate of each set represents a position of the pointing object with respect to the content displaying surface, and the Z coordinate of each set represents a distance of the pointing object above the content displaying surface; and wherein the change between the corresponding coordinate values in each set determines the speed at which the pointing object is approaching the content displaying surface.

15. The display according to claim 1, wherein the motion sensor is an accelerometer.

16. The method according to claim 8, wherein the motion sensor is an accelerometer.

* * * * *